United States Patent
Yoshimoto

(10) Patent No.: US 10,187,671 B2
(45) Date of Patent: Jan. 22, 2019

(54) APPARATUS AND METHOD FOR TRANSMITTING AND RECEIVING CONTENT

(71) Applicant: SAMSUNG ELECTRONICS CO., LTD., Suwon-si (KR)

(72) Inventor: Morio Yoshimoto, Kanagawa (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/171,649

(22) Filed: Jun. 2, 2016

(65) Prior Publication Data

US 2016/0277775 A1     Sep. 22, 2016

Related U.S. Application Data

(63) Continuation of application No. PCT/KR2014/011628, filed on Dec. 1, 2014.

(30) Foreign Application Priority Data

Dec. 2, 2013  (JP) .................................. 2013-249025
Nov. 28, 2014 (KR) ........................ 10-2014-0169177

(51) Int. Cl.
*H04N 21/2385* (2011.01)
*H04N 21/262* (2011.01)
(Continued)

(52) U.S. Cl.
CPC ..... *H04N 21/2385* (2013.01); *H04L 12/6418* (2013.01); *H04L 65/4084* (2013.01);
(Continued)

(58) Field of Classification Search
CPC ......... H04N 21/2385; H04N 21/26216; H04N 21/2402; H04N 21/2381
See application file for complete search history.

(56) References Cited

U.S. PATENT DOCUMENTS 7,979,550 B2 *  7/2011  Xiao ....................... H04L 47/70
                                                            709/223
8,813,159 B2    8/2014  Hirano et al.
(Continued)

FOREIGN PATENT DOCUMENTS

JP    2007325109 A    12/2007
JP    200955367 A     3/2009
(Continued)

OTHER PUBLICATIONS

International Search Report (PCT/ISA/210) dated Mar. 6, 2015, issued by the International Searching Authority in counterpart International Application No. PCT/KR2014/011628.
(Continued)

*Primary Examiner* — Pinkal R Chokshi
(74) *Attorney, Agent, or Firm* — Sughrue Mion, PLLC

(57) ABSTRACT

A content receiving apparatus includes a network interface receiving first content from a first transmitting apparatus and receiving second content from a second transmitting apparatus, and a controller selecting the first content based on a user's input, from the first content and the second content, in which the controller increases a first bandwidth of a bandwidth of the network interface, which is allotted to the first transmitting apparatus, and decreases a second bandwidth of the bandwidth of the network interface, which is allotted to the second transmitting apparatus, based on an increased first bandwidth.

18 Claims, 7 Drawing Sheets

(51) Int. Cl.
    *H04N 21/438* (2011.01)
    *H04N 21/266* (2011.01)
    *H04N 21/24* (2011.01)
    *H04N 21/2381* (2011.01)
    *H04N 21/4367* (2011.01)
    *H04L 29/06* (2006.01)
    *H04L 12/64* (2006.01)

(52) U.S. Cl.
    CPC ......... *H04L 65/80* (2013.01); *H04N 21/2381* (2013.01); *H04N 21/2402* (2013.01); *H04N 21/262* (2013.01); *H04N 21/266* (2013.01); *H04N 21/26216* (2013.01); *H04N 21/4367* (2013.01); *H04N 21/4383* (2013.01)

(56) References Cited

U.S. PATENT DOCUMENTS

| | | | | |
|---|---|---|---|---|
| 9,197,559 | B1* | 11/2015 | Cloonan | H04L 41/12 |
| 2008/0159212 | A1* | 7/2008 | Zhang | H04W 16/06 |
| | | | | 370/329 |
| 2008/0195745 | A1* | 8/2008 | Bowra | H04L 29/06027 |
| | | | | 709/231 |
| 2008/0294758 | A1* | 11/2008 | Xiao | H04L 47/70 |
| | | | | 709/221 |
| 2009/0157205 | A1 | 6/2009 | Inoue et al. | |
| 2009/0185619 | A1* | 7/2009 | Taleb | H04N 21/2335 |
| | | | | 375/240.02 |
| 2009/0193485 | A1* | 7/2009 | Rieger | H04N 21/2402 |
| | | | | 725/114 |
| 2012/0180101 | A1* | 7/2012 | Davis | H04N 21/23608 |
| | | | | 725/116 |
| 2012/0311043 | A1 | 12/2012 | Chen et al. | |
| 2016/0198198 | A1* | 7/2016 | Iwami | H04N 21/2385 |
| | | | | 725/116 |

FOREIGN PATENT DOCUMENTS

| | | |
|---|---|---|
| JP | 2011155406 A | 8/2011 |
| KR | 1020080030678 A | 4/2008 |
| KR | 1020110029920 A | 3/2011 |
| KR | 1020120023878 A | 3/2012 |
| KR | 1020130008522 A | 1/2013 |
| KR | 1020130129972 A | 11/2013 |
| WO | 2012081170 A1 | 6/2012 |

OTHER PUBLICATIONS

Written Opionion (PCT/ISA/237) dated Mar. 6, 2015, issued by the International Searching Authority in counterpart International Application No. PCT/KR2014/011628.

Communication dated Jul. 18, 2017, from the Japanese Patent Office in counterpart application No. 2013-249025.

Communication dated Nov. 21, 2017, from the Japanese Patent Office in counterpart application No. 2013-249025.

Nicola Baldo et al. "RTCP Feedback Based Transmission Rate Control for 3G Wireless Multimedia Streaming" IEEE International Symposium PIMRC, Sep. 5, 2004, (pp. 1817-1821).

Elan Amir et al. "Receiver-driven Bandwidth Adaption for Lightweight Sessions" ACM Multimedia, Nov. 9, 1997, (pp. 415-426).

* cited by examiner

APPARATUS AND METHOD FOR TRANSMITTING AND RECEIVING CONTENT

CROSS REFERENCE TO RELATED APPLICATIONS

This application is a continuation of International Patent Application No. PCT/KR2014/011628 filed on Dec. 1, 2014, claiming priority from Japanese Patent Application No. 2013-249025 filed Dec. 2, 2013 and Korean Patent Application No. 10-2014-0169177 filed on Nov. 28, 2014, the contents of which are incorporated herein by reference.

TECHNICAL FIELD

The present disclosure relates to a content transmitting apparatus that distributes content in real time via an Internet protocol (IP) network and a content receiving apparatus that receives content that is distributed in real time, and more particularly, to quality of service (QoS) control of a session that transmits content in real time.

BACKGROUND ART

Recently, a home network integrating various transmission routes such as wired local area network (LAN), wireless LAN, WiFi (registered trademark), WiFi Direct, etc. is widely installed in home. Also, as a digital living network alliance (DLNA) guideline is established, various AV devices such as TV receivers or home servers are connected to a home network to transmit or receive content such as an image or voice. Accordingly, contents stored in a home server may be viewed or listened through a TV receiver installed in another room or a tablet terminal moved to a certain place in a house.

Home network may be connected to a wide area network such as the Internet. A TV receiver connected to a home network through an extended IP network may simultaneously received a plurality of contents (data stream) distributed in real time by various content providers. (For example, please see Patent document 1)

A standard protocol specification for distributing content in real time via an IP network includes a real-time transport protocol (RTP)/an RTP control protocol (RTCP) or a real-time streaming protocol (RTSP). In RTP/RTCP or RTSP, a receiving apparatus regularly sends a receiving report to a transmitting apparatus, and the transmitting apparatus changes a transmission rate according to the receiving report sent by the receiving apparatus. Accordingly, particularly in a network interface such as wireless LAN in which a receiving state varies time to time, the transmission rate is optimized according to a varying network environment so that the receiving apparatus may always receive content in an optimal state.

However, in RTP/RTCP or RTSP, since adjustment of a bandwidth between transmitting apparatuses is not specified, if contents are independently distributed in a plurality of sessions, it is a problem that a bandwidth is occupied by a particular session. For example, in a network environment having a bandwidth of 20 Mbps, when a bandwidth of a transmitting apparatus (A) is 19 Mbps, a bandwidth to be allotted to another transmitting apparatus (B) is only 1 Mbps so that the transmitting apparatus (B) cannot distribute content with a sufficient quality. Also, when a transmission rate of the transmitting apparatus (B) varies, packet loss is generated in streaming data of the transmitting apparatus (A). As a result, both the transmitting apparatuses (A) and (B) may not transmit contents with a sufficient quality. Furthermore, when the transmitting apparatus (A) is disconnected, the bandwidth to be allotted to the transmitting apparatus (B) is increased so that the transmitting apparatus (B) can distribute content with a sufficient quality. However, if one desires to receive content again from the transmitting apparatus (A), re-receiving of content takes time because session between the transmitting apparatus (A) and the receiving apparatus (B) needs to be re-established and buffering of data needs to be performed again.

PRIOR ART DOCUMENT

Patent document 1: Japanese Patent Publication No. 2011-155406

DETAILED DESCRIPTION OF THE DISCLOSURE

Technical Problem

The present disclosure provides quality of service (QoS) control of a session by a content receiving apparatus during a real-time distribution of content according to a standard specification such as a real-time transport protocol (RTP)/an RTP control protocol (RTCP) or a real-time streaming protocol (RTSP).

Advantageous Effects

According to the present disclosure, quality of service (QoS) of a session may be controlled by a content receiving apparatus during a real-time distribution of content according to a standard specification such as a real-time transport protocol (RTP)/an RTP control protocol (RTCP) or a real-time streaming protocol (RTSP). Thus, when a plurality of sessions exist in an Internet protocol (IP) network, the bandwidths of the respective sessions are adjusted by the content receiving apparatus according to a user's content viewing situation so that content of a good quality may be received.

BEST MODE

Figure 1:
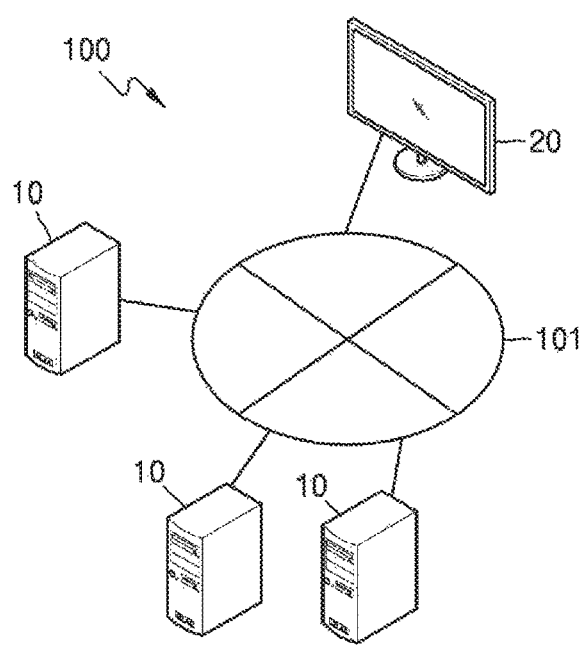
FIG. 1 is a schematic view of a content distribution system according to an embodiment.

According to an aspect of the present disclosure, there is provided a content receiving apparatus, which includes a network interface receiving first content from a first transmitting apparatus and receiving second content from a second transmitting apparatus, and a controller selecting the first content based on a user's input, from the first content and the second content, in which the controller increases a first bandwidth of a bandwidth of the network interface, which is allotted to the first transmitting apparatus, and decreases a second bandwidth of the bandwidth of the network interface, which is allotted to the second transmitting apparatus, based on an increased first bandwidth.

The controller may determine a first target transmission rate corresponding to the increased first bandwidth, measure a first transmission rate at which the first content is received, and control the network interface to transmit information about the first target transmission rate to the first transmitting apparatus when the measured first transmission rate is lower than the first target transmission rate.

The information about the first target transmission rate may include a request message requesting that the first transmitting apparatus transmits the first content at the first target transmission rate.

The controller may determine a second target transmission rate corresponding to the decreased second bandwidth, measure a second transmission rate at which the second content is received, and control the network interface to transmit information about the second target transmission rate to the second transmitting apparatus when the measured second transmission rate is higher than the second target transmission rate.

The controller may measure a first packet loss rate related to the first transmitting apparatus, determine a first target packet loss rate based on the increased first bandwidth and the measured first packet loss rate, and control the network interface to transmit information about the determined first target packet loss rate to the first transmitting apparatus.

The information about the determined first target packet loss rate may include a request message requesting that the first transmitting apparatus transmits the first content at the first target packet loss rate.

The controller may measure a second packet loss rate related to the second transmitting apparatus, determine a second target packet loss rate based on the decreased second bandwidth and the measured second packet loss rate, and control the network interface to transmit information about the determined second target packet loss rate to the second transmitting apparatus.

According to an aspect of the present disclosure, there is provided a content receiving method, which includes receiving first content from a first transmitting apparatus and second content from a second transmitting apparatus through a network interface, selecting the first content based on a user's input, from the first content and the second content, and controlling a first bandwidth of a bandwidth of the network interface, which is allotted to the first transmitting apparatus to increase, and a second bandwidth of the bandwidth of the network interface, which is allotted to the second transmitting apparatus, to decrease based on the increased first bandwidth.

In the controlling of the first bandwidth and the second bandwidth, a first target transmission rate corresponding to the increased first bandwidth may be determined, a first transmission rate at which the first content is received may be measured, and the network interface may be controlled to transmit information about the first target transmission rate to the first transmitting apparatus when the measured first transmission rate is lower than the first target transmission rate.

The information about the first target transmission rate may include a request message requesting that the first transmitting apparatus transmits the first content at the first target transmission rate.

In the controlling of the first bandwidth and the second bandwidth, a second target transmission rate corresponding to the decreased second bandwidth may be determined, a second transmission rate at which the second content is received may be measured, and the network interface may be controlled to transmit information about the second target transmission rate to the second transmitting apparatus when the measured second transmission rate is higher than the second target transmission rate.

In the controlling of the first bandwidth and the second bandwidth, a first packet loss rate related to the first transmitting apparatus may be measured, a first target packet loss rate may be determined based on the increased first bandwidth and the measured first packet loss rate, and the network interface may be controlled to transmit information about the determined first target packet loss rate to the first transmitting apparatus.

The information about the first target packet loss rate may include a request message requesting that the first transmitting apparatus transmits the first content at the first target packet loss rate.

In the controlling of the first bandwidth and the second bandwidth, a second packet loss rate related to the second transmitting apparatus may be measured, a second target packet loss rate may be measured based on the decreased second bandwidth and the measured second packet loss rate, and the network interface may be controlled to transmit information about the determined second target packet loss rate to the second transmitting apparatus.

According to an aspect of the present disclosure, there is provided a content transmitting apparatus, which includes an encoder encoding content in a predetermined encoding format, a packetizer packetizing the content encoded by the encoder, a communication controller connected to a network and establishing a session with a content receiving apparatus, and transmitting the packetized content to the content receiving apparatus at a set transmission rate through each session, and changing the transmission rate according to information related to a receiving state of the content received from the content receiving apparatus, which is performed by the communication controller.

Mode of the Inventive Concept

The present disclosure will now be described more fully with reference to the accompanying drawings, in which embodiments of the disclosure are shown. The disclosure may, however, be embodied in many different forms and should not be construed as being limited to the embodiments set forth herein.

FIG. 1 is a schematic view of a content distribution system 100 according to an embodiment. In the content distribution system 100, a plurality of content transmitting apparatuses 10 and a content receiving apparatus 20 according to an embodiment are connected to an Internet protocol (IP) network 101. The IP network 101 is an integrated network including the Internet and a home local area network (LAN) connected to the Internet via a router (not shown). An IP address is assigned to each of devices connected the IP network 101 and each device may perform communication by identifying communication counterparts with IP addresses.

Each of the content transmitting apparatus 10 is a server device arranged at a side of, for example, a content provider. The content transmitting apparatus 10 stores various types of contents such as image contents or voice contents and distributes the contents to one or a plurality of client devices on the IP network 101 by unicast or multicast. The content is distributed in real time according to a transport protocol specification such as a real-time transport protocol (RTP)/an RTP control protocol (RTCP) or a real-time streaming protocol (RTSP). The content receiving apparatus 20 corresponds to the client device receiving the content that is distributed in real time by the content transmitting apparatus 10 and may be implemented by, for example, a TV receiver, a tablet terminal, or a personal computer (PC).

Figure 2:
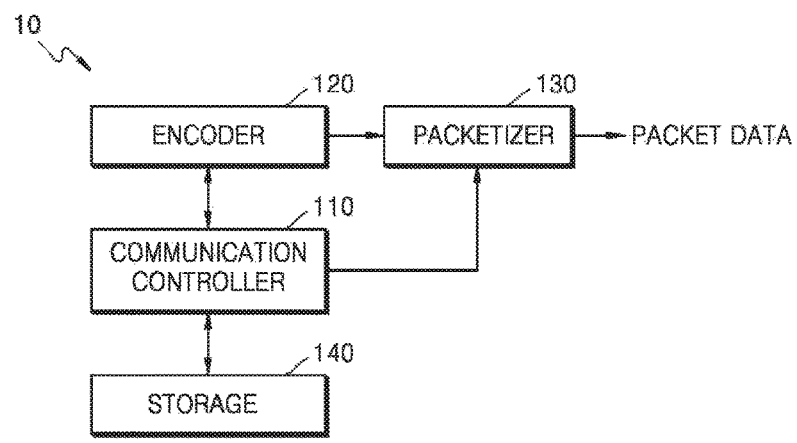
FIG. 2 is a block diagram of a structure of a content transmitting apparatus according to an embodiment.

FIG. 2 is a block diagram of a structure of the content transmitting apparatus 10 according to an embodiment.

The content transmitting apparatus 10 of FIG. 2 may include a communication controller 110, an encoder 120, a packetizer 130, and a storage 140.

The communication controller 110 connects to the IP network 101, establishes a session with the content receiving apparatus 20, and controls encoding and packetizing processes of the encoder 120 and the packetizer 130. Also, the communication controller 110 changes a transmission rate according to a receiving state of a session received from the content receiving apparatus 20.

The encoder 120 encodes content in a predetermined encoding format according to a control signal of the communication controller 110.

The packetizer 130 IP-packetizes the content encoded by the encoder 120 by dividing the encoded content into a plurality of payload data, according to the control signal of the communication controller 110, and transmits packet data at a transmission rate set through each session.

The storage 140 stores the content to be transmitted to the content receiving apparatus 20.

Figure 3:
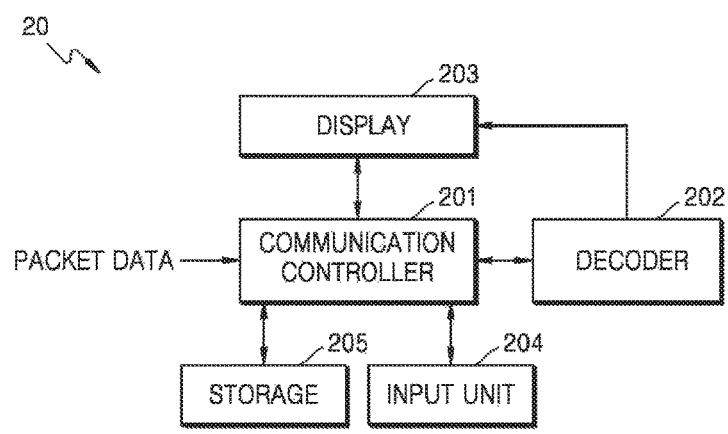
FIG. 3 is a block diagram of a structure of a content receiving apparatus according to an embodiment.

FIG. 3 is a block diagram of a structure of the content receiving apparatus 20 according to an embodiment.

The content receiving apparatus 20 of FIG. 3 may include a communication controller 201, a decoder 202, a display 203, an input unit 204, and a storage 205.

The communication controller 201 establishes a session with at least one of the content transmitting apparatuses 10 connected to the IP network 101, receives packet data of the content distributed in real time by the at least one of the content transmitting apparatuses 10 through the session, measures a receiving state such as a packet loss rate when receiving the packet data of the content, and notifies the at least one of the content transmitting apparatus 10 of the receiving state based on a result of the measurement of a receiving state.

The decoder 202 decodes and reproduces the packet data received through the communication controller 201.

The display 203 displays information about a series of operation states and an operation result generated during performance of a communication function by the communication controller 201, and displays the content decoded by the decoder 202. The display 203 may include a liquid crystal display (LCD), a thin film transistor LCD (TFT-LCD), an organic light-emitting diode (OLED), a light-emitting diode (LED), an active matrix organic LED (AMO-LED), a flexible display, and a three-dimensional display, but the present disclosure is not limited thereto.

The input unit 204 receives input of various pieces of information such as numbers or characters, and delivers signal inputs regarding various function controls to the communication controller 201. The input unit 204 may include a key input device such as a keyboard or a keypad, a touch input device such as a touch sensor or a touch pad, a gesture input device including at least one of a gyro sensor, a geomagnetic sensor, an acceleration sensor and a proximity sensor, and a camera, and/or a voice input device, but the present disclosure is not limited thereto.

The storage 205 stores applied programs needed for operations of functions according to an embodiment and various data created during execution of the applied programs. The storage 205 may include storage media such as a flash memory, a hard disk, a multimedia card type memory, a random access memory (RAM), or a read-only memory (ROM), but the present disclosure is not limited thereto.

Figure 4:
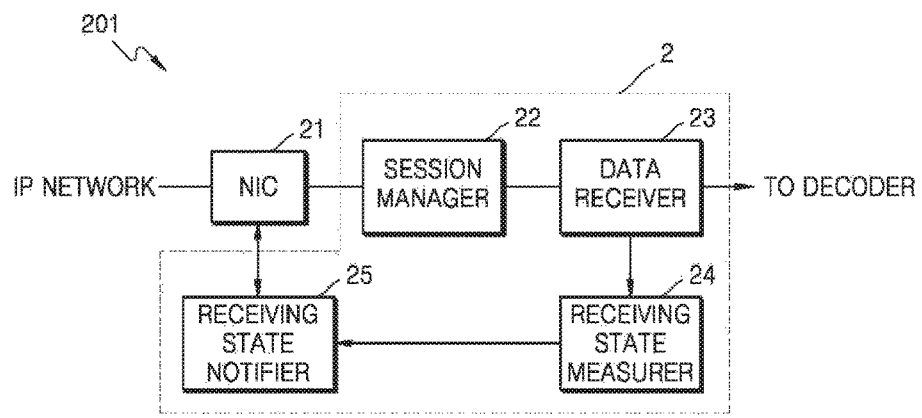
FIG. 4 is a block diagram of a structure of a communication controller of a content receiving apparatus according to an embodiment.

FIG. 4 is a block diagram of a structure of the communication controller 201 of the content receiving apparatus 20 according to an embodiment.

A structure of a communication function portion of the communication controller 201 is described below with reference to FIG. 4.

The communication controller 201 may include a network interface (NIC) 21 and a controller 2. The controller 2 may include a session manager 22, a data receiver 23, a receiving state measurer 24, and a receiving state notifier 25.

The NIC 21 is one of various network interfaces, for example, wireless LAN, WiFi (registered trademark), WiFi Direct, wired LAN, power line communications (PLC), etc. in a 2.4 GHz or 5.2 GHz band defined by a transmission specification of IEEE802.11b/11a/11g/11n/11ac. The NIC 21 is assigned with an IP address. The content receiving apparatus 20 is identified, whether it is a unicast destination or a multicast destination of real-time contact, according to the IP address assigned to the NIC 21. The NIC 21 receives content from a plurality of transmitting apparatuses. For example, the NIC 21 receives first content from a first transmitting apparatus and second content from a second transmitting apparatus.

The controller 2 selects the first content of the first content and the second content received from the NIC 21 based on a user's input.

Also, the controller 2 increases a first bandwidth allotted to the first transmitting apparatus of the bandwidth of the NIC 21, and decreases a second bandwidth allotted to the second transmitting apparatus of the bandwidth of the NIC 21 based on an increased first bandwidth.

In detail, in the controller 2, the session manager 22 establishes a communication session with the content transmitting apparatus 10 by using the IP address assigned to the NIC 21. The session signifies an active connection between the content transmitting apparatus 10 and the content receiving apparatus 20. As illustrated in FIG. 1, when the content transmitting apparatuses 10 exist and contents are received in real time from the respective content transmitting apparatuses 10, the session manager 22 establishes an individual communication session with each of the content transmitting apparatuses 10. Also, the content receiving apparatus 20 may perform TCP communication through the NIC 21 with other server devices (not shown). In this case, the session manager 22 establishes another session with a server device. As such, as a plurality of sessions are established by the session manager 22, the bandwidth of the NIC 21 is divided by these sessions.

Each of the content transmitting apparatuses 10 encodes content in a predetermined encoding format, IP-packetizes the encoded content by dividing the encoded content into a plurality of payload data, and transmits packet data (streaming data) through each session established by the session manager 22.

The data receiver 23 receives packet data through the session established with each of the content receiving apparatuses 20 and reconstructs the encoded content by extracting payload data from the packet data. Each of the reconstructed contents is decoded and reproduced by a decoder (not shown) in the content receiving apparatus 20.

The receiving state measurer 24 measures a receiving state when the data receiver 23 receives packet data of content from each of the content transmitting apparatuses 10. The receiving state and a usable bandwidth are correlated. For example, if a sufficient bandwidth is not allotted to a certain session, a receiving state is deteriorated and thus, when data is transmitted at a high transmission rate, a packet loss rate or a delay variation amount increases. In contrast, if a sufficient bandwidth is allotted to a certain session, quality of the session gets better and thus, even when data is transmitted at a high transmission rate, the data may be received with a low packet loss rate and a small delay variation amount. As such, each receiving state may be measured by using a packet loss rate in the session. The receiving state measurer 24 calculates a packet loss rate for each session when the data receiver 23 receives packet data of content, and measures a receiving state by comparing the packet loss rates of the sessions.

Also, the receiving state measurer 24 may estimate a transmission rate of each of the content transmitting apparatuses 10 based on a detected receiving state. The transmission rate may be calculated by, for example, a resolution, a displayed color, or a frame rate of the content distributed through the session. The estimated transmission rate is referred to when a QoS of a session with the content transmitting apparatus 10, of which a transmission rate is to be reduced, is controlled. The QoS control of a session is described later.

Each of the content transmitting apparatuses 10 is notified of a receiving state based on a result of the measurement by the receiving state measurer 24. When real-time content is distributed according to RTP/RTCP, a receiving state of RTP data is delivered to each of the content transmitting apparatuses or the information about the content transmitting apparatus or session information of the content receiving apparatus 20 is exchanged. In RTCP, a receiver report (RR) exists in one of reports notified by the receiving apparatus to the transmitting apparatus, and the receiving apparatus may notify the transmitting apparatus of a receiving state, that is, the quality of the session ("수신 상태, 즉, 수신 상태를 ", 국문확인요 ) through the RR. In detail, the receiving state notifier 25 may notify each of the content transmitting apparatuses 10 of a receiving state by setting a value with a parameter fraction lost or a cumulative number of packets lost in the RR.

When being notified of a receiving state from the content receiving apparatus 20, each of the content transmitting apparatuses 10 may change the transmission rate according to the notified receiving state. For example, if the value of fraction lost or a cumulative number of packets lost is high, the content transmitting apparatus 10 lowers the transmission rate to prevent the packet loss. In contrast, if the value of fraction lost or a cumulative number of packets lost is low, the content transmitting apparatus 10 determines that a sufficient bandwidth is secured so as to increase the transmission rate.

In RTP/RTCP that is a standard specification, as described above, the transmitting apparatus changes the transmission rate according to the receiving state notified by the receiving apparatus, and no device to control or request a change of the transmission rate by the receiving apparatus with respect to the transmitting apparatus is prepared. Thus, the receiving state notifier 25 notifies a certain one of the content transmitting apparatuses 10 of a receiving state having a different value from the result of measurement of the receiving state measurer 24.

When the content receiving apparatus 20 notifies the content transmitting apparatus 10 of a receiving state having a value different from an actual value, the content transmitting apparatus 10 changes the transmission rate according to the notified receiving state. Thus, the content receiving apparatus 20 may substantially control the transmission rate of the certain one of the content transmitting apparatus 10.

Figure 5:
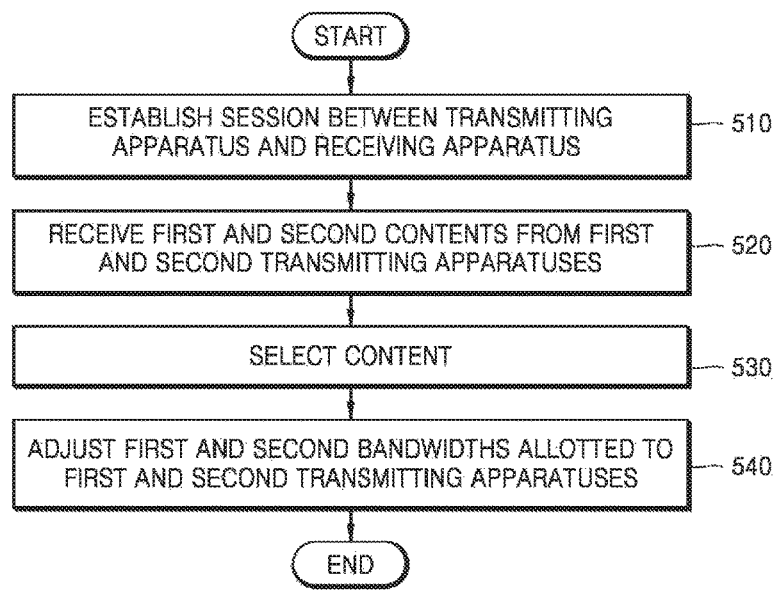
FIG. 5 is a flowchart of a content receiving method according to an embodiment.

FIG. 5 is a flowchart of a content receiving method according to an embodiment.

In Operation 510, the content receiving apparatus 20 including a network interface connected to an IP network establishes a session with at least one of the content transmitting apparatuses 10 connected to the IP network.

In Operation 520, the content receiving apparatus 20 receives real-time content distributed by each of the content transmitting apparatuses 10 through each established session. In an example, the content receiving apparatus 20 receives first content and second content respectively from a first content transmitting apparatus and a second content transmitting apparatus via the NIC 21.

In Operation 530, the content receiving apparatus 20 selects the first content based on a user's input among the first and second contents distributed by the content transmitting apparatuses 10.

In Operation 540, the content receiving apparatus 20 controls the network interface to increase a first bandwidth of a bandwidth of the network interface, which is allotted to the first transmitting apparatus, and decreases a second bandwidth of the bandwidth of the network interface, which is allotted to the second transmitting apparatus, based on an increased first bandwidth.

In an embodiment, the content receiving apparatus 20 controls the network interface to determine a first target transmission rate corresponding to the increased first bandwidth, measure a first transmission rate at which the first content is received, and transmit information related to the first target transmission rate to the first transmitting apparatus when the measured first transmission rate is lower than the first target transmission rate. The information related to the first target transmission rate may include a request message requesting the first transmitting apparatus to transmit the first content at the first target transmission rate.

The content receiving apparatus 20 controls the network interface to determine a second target transmission rate corresponding to a decreased second bandwidth, measure a second transmission rate at which the second content is received, and transmit information related to the second target transmission rate to the second transmitting apparatus when the measured second transmission rate is higher than the second target transmission rate.

In another embodiment, the content receiving apparatus 20 controls the network interface to measure a first packet loss rate related to the first transmitting apparatus, determine a first target packet loss rate based on the increased first bandwidth and the measured first packet loss rate, and transmit information related to the determined first target packet loss rate to the first transmitting apparatus. The information related to the first target packet loss rate may include a request message requesting the first transmitting apparatus to transmit the first content at the first target packet loss rate.

The content receiving apparatus 20 controls the network interface to measure a second packet loss rate related to the second transmitting apparatus, determine a second target packet loss rate based on a decreased second bandwidth and a measured second packet loss rate, and transmit information related to the determined second target packet loss rate to the second transmitting apparatus.

The content transmitting apparatus 10 changes the transmission rate according to the information about a transmission rate received from the content receiving apparatus 20, and to the information about a receiving state.

Figure 6:
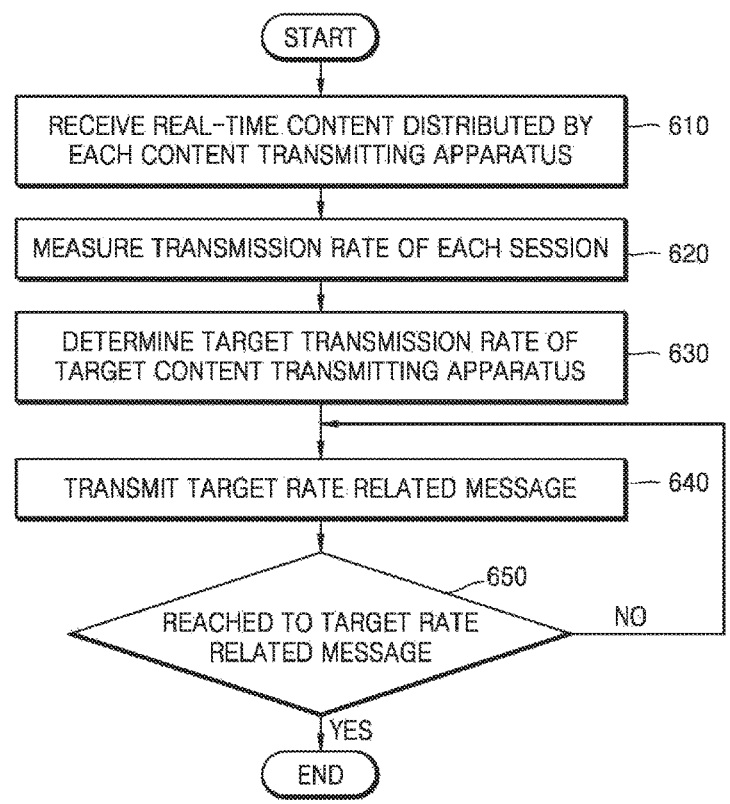
FIG. 6 is a flowchart of QoS control by a content receiving apparatus according to an embodiment.

FIG. 6 is a flowchart of QoS control by a content receiving apparatus according to an embodiment.

The QoS control of a session by the content receiving apparatus 20 is described in detail with reference to FIG. 6.

First, the content receiving apparatus 20 establishes a session with each of the content transmitting apparatuses 10, and the data receiver 23 receives real-time content distributed by each of the content transmitting apparatuses 10 through each of the established sessions (Operation 610). The content receiving apparatus 20 measures a transmission rate based on a receiving state measured for each session (Operation 620). The measurement of a receiving state may be performed by calculating a packet loss rate of a corresponding session as described above.

When the content receiving apparatus 20 simultaneously receives real-time contents from the content transmitting apparatuses 10, a user may appropriately select content to view on the content receiving apparatus 20. For example the content receiving apparatus 20 selects first content, based on a user's input, from first content of a first transmitting apparatus and second content of a second transmitting apparatus. The user may display content to view on a screen and minimize a screen of content that the user does not want to view. In this state, although the content receiving apparatus 20 continuously receives, in the background, the content that the user does not want to view, the content may be received in a minimum receiving state because the content does not need to be displayed on the screen. In other words, the content transmitting apparatus 10 distributes the content that the user does not want to view at a transmission rate as low as possible. Accordingly, an extra bandwidth may be allotted to other sessions. In other words, the content receiving apparatus 20 increases the first bandwidth of the bandwidth of the network interface, which is allotted to the first transmitting apparatus, and decreases the second bandwidth of the bandwidth of the network interface, which is allotted to the second transmitting apparatus, based on an increased first bandwidth.

To decrease a bandwidth of a session that transmits the content that the user does not want to view, the content receiving apparatus 20 calculates a minimum transmission rate, at which the content transmitting apparatus 10 (the target content transmitting apparatus 10) that needs to lower the transmission rate may distribute the content, and sets the minimum transmission rate as a target value (Operation 630). The content receiving apparatus 20 notifies the target content transmitting apparatus 10 of a target transmission rate related message indicating that content is transmitted at the target transmission rate (Operation 640).

In an embodiment, the content receiving apparatus 20 determines a first target transmission rate corresponding to the increased first bandwidth, measures a first transmission rate at which the first content is received, and transmits information about the first target transmission rate to the first transmitting apparatus when the measured first transmission rate is lower than the first target transmission rate.

Also, the content receiving apparatus 20 determines a second target transmission rate corresponding to the decreased second bandwidth, measures a second transmission rate at which the second content is received, and transmits information about the second target transmission rate to the second transmitting apparatus when the measured second transmission rate is higher than the second target transmission rate.

In another embodiment, the content receiving apparatus 20 measures a first packet loss rate related to the first transmitting apparatus, determines a first target packet loss rate based on the increased first bandwidth and a measured first packet loss rate, and transmits information about a determined first target packet loss rate to the first transmitting apparatus. Also, the content receiving apparatus 20 measures a second packet loss rate related to the second transmitting apparatus, determines a second target packet loss rate based on the decreased second bandwidth and a measured second packet loss rate, and transmits information about a determined second target packet loss rate to the second transmitting apparatus.

In another embodiment, the content receiving apparatus 20 notifies the target content transmitting apparatus 10 of a receiving state having a value worse (lower) than that of a measured actual receiving state, for example, a value of fraction lost or a cumulative number of packets lost that is intentionally increased (Operation 640).

As the target transmission rate related message is notified, the target content transmitting apparatus 10 begins to lower the transmission rate. The content receiving apparatus 20 continuously notifies the target content transmitting apparatus 10 of the target transmission rate related message until the transmission rate of the target content transmitting apparatus 10 is lowered to a target value, that is, a minimum transmission rate ("NO" in Operation 650). In another embodiment, the content receiving apparatus 20 continuously notifies the target content transmitting apparatus 10 of a receiving state having a value worse than an actual value. When the transmission rate of the target content transmitting apparatus 10 is lowered to the target value ("YES" in Operation 650), the QoS control of a session by the content receiving apparatus 20 is terminated.

Figure 7:
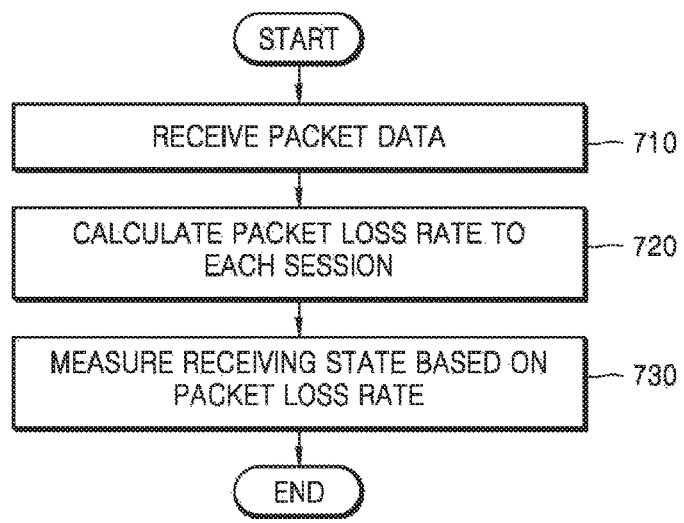
FIG. 7 is a flowchart of a receiving state measurement by a content receiving apparatus according to an embodiment.

FIG. 7 is a flowchart of a receiving state measurement by the content receiving apparatus 20 according to an embodiment.

In Operation 710, the content receiving apparatus 20 receives packet data of real-time first and second contents distributed by the first content transmitting apparatus and the second content transmitting apparatus.

In Operation 720, the content receiving apparatus 20 calculates a packet loss rate for each session when packet data of each content is received.

In Operation 730, the content receiving apparatus 20 measures a receiving state based on the packet loss rate.

Figure 8:
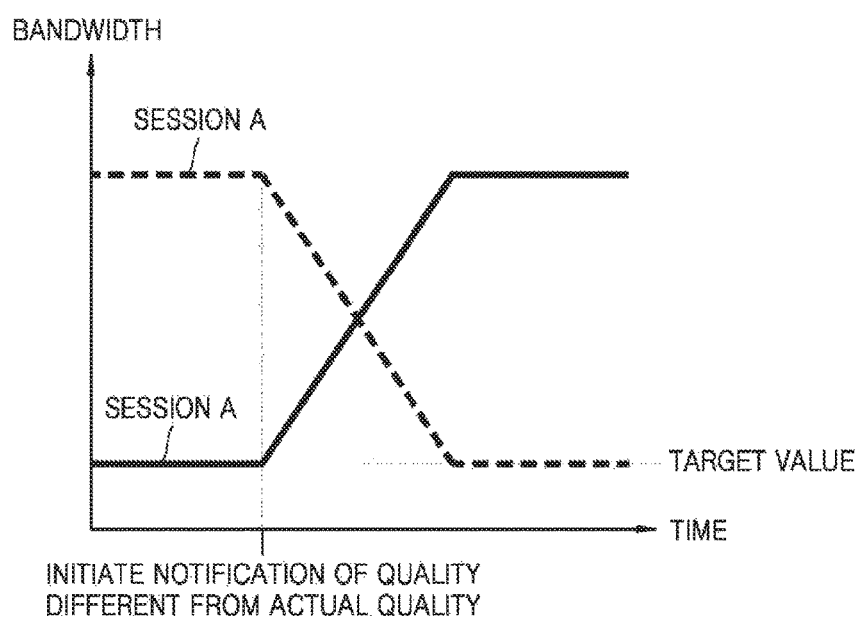
FIG. 8 is a graph of a change in the bandwidths of two sessions by the QoS control, according to an embodiment.

FIG. 8 is a graph of a change in the bandwidths of two sessions by the QoS control, according to an embodiment. When a session A and a session B divide the bandwidth of the NIC 21 and content transmitted through the session A is one that is not viewed, a bandwidth of the session A may be reduced by the QoS control of the content receiving apparatus 20. Accordingly, the bandwidth of the NIC 21 has an extra bandwidth, and the extra bandwidth is allotted to the session B so that a bandwidth of the session B is increased.

When the bandwidth of the NIC 21 has an extra bandwidth after the transmission rate of the target content transmitting apparatus 10 is lowered to a minimum, the content receiving apparatus 20 may notify the target content transmitting apparatus 10 of quality (content receiving state) of an improved value. Accordingly, since the transmission rate of the target content transmitting apparatus 10 is slightly increased from the minimum transmission rate, when the content distributed by the target content transmitting apparatus 10 is selected again by a user, the selected content may be quickly displayed on the screen.

When the bandwidth of the session B is more quickly increased, the content receiving apparatus 20 may notify the content transmitting apparatus 10, whose transmission rate is to be increased, of quality (receiving state) having a value better (higher) than that of measured actual quality (receiving state), for example, a value of fraction lost or a cumulative number of packets lost that is intentionally decreased. As such, the transmission rate of the content transmitting apparatus 10 whose transmission rate is to be increased is quickly increased and thus the bandwidth of the session B may be quickly increased.

Figure 9:
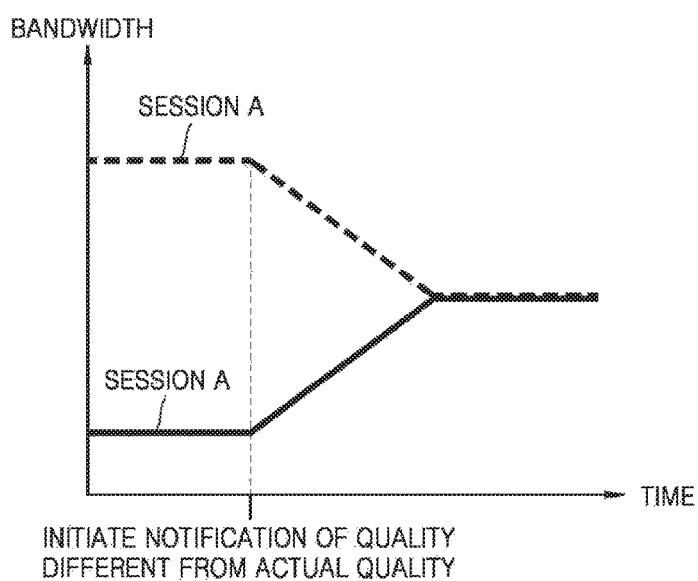
FIG. 9 is a graph of a change in the bandwidths of two sessions by the QoS control, according to another embodiment.

FIG. 9 is a graph of a change in the bandwidths of two sessions by the QoS control, according to another embodiment. Instead of lowering the transmission rate of the target content transmitting apparatus 10 to the minimum transmission rate, the transmission rate of the target content transmitting apparatus 10 may be lowered such that the bandwidths of the session A and the session B are the same as each other. In this case, the content receiving apparatus 20 estimates the transmission rates of the two content transmitting apparatuses 10 and continuously notifies the target content transmitting apparatus 10 (session A) of quality (receiving state) having a value worse than an actual value until the transmission rates of the two content transmitting apparatuses 10 are the same as each other. Accordingly, as the bandwidth of the session A decreases, the bandwidth of the NIC 21 has an extra bandwidth and the extra bandwidth is allotted to the session B. Thus, the bandwidth of the session B increases so that the bandwidths of the sessions A and B are almost the same as each other.

Alternatively, instead of setting the bandwidths of the sessions A and B to be the same as each other, target bandwidths of the sessions A and B may be set according to the type of content transmitted through each session. For example, when an image content of 1920×1080p is transmitted through the session A and an image content of 1280×720p is transmitted through the session B, the bandwidth may be distributed in proportion to an amount of information of each session such that ⅔ of a total bandwidth is distributed to the session A and ⅓ of the total bandwidth is distributed to the session B. The bandwidth of each session may be set to be close to the target value by notifying each of the content transmitting apparatuses 10 of quality (receiving state) having a value different from an actual value so as to have a proportionally distributed bandwidth.

Also, when there is only one content transmitting apparatus 10, as quality (receiving state) having a value worse than an actual value is notified to the content transmitting apparatus 10, the transmission rate of the content transmitting apparatus 10 is lowered so that the bandwidth of the IP network 101 has an extra bandwidth. Accordingly, the extra bandwidth may be allotted to other communications.

The disclosure can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While this disclosure has been particularly shown and described with reference to preferred embodiments thereof, it will be understood by those of ordinary skill in the art that various changes in form and details may be made therein without departing from the spirit and scope of the disclosure as defined by the appended claims. The preferred embodiments should be considered in descriptive sense only and not for purposes of limitation. Therefore, the scope of the disclosure is defined not by the detailed description of the disclosure but by the appended claims, and all differences within the scope will be construed as being included in the present disclosure.

INDUSTRIAL APPLICABILITY

The apparatus and method for transmitting and receiving content according to the present disclosure may be generally applied to computers, televisions, mobile terminals, audio/visual (AV) devices, etc.

The invention claimed is:

1. A content receiving apparatus comprising:
a network interface receiving first content from a first transmitting apparatus and receiving second content from a second transmitting apparatus; and
a controller selecting the first content based on a user's input, from the first content and the second content,
wherein the controller increases a first bandwidth of a bandwidth of the network interface, which is allotted to the first transmitting apparatus, and decreases a second bandwidth of the bandwidth of the network interface, which is allotted to the second transmitting apparatus, based on an increased first bandwidth,
wherein the first transmitting apparatus and the second transmitting apparatus are independent from each other,
wherein the first content is different from the second content,
wherein the controller determines a second target transmission rate corresponding to the decreased second bandwidth, and does not decrease the second bandwidth below the determined second target transmission rate, and
wherein the determined second target transmission rate is a minimum transmission rate required for the second transmitting apparatus to transmit the second content to the network interface.

2. The content receiving apparatus of claim 1, wherein the controller determines a first target transmission rate corresponding to the increased first bandwidth, measures a first transmission rate at which the first content is received, and controls the network interface to transmit information about the first target transmission rate to the first transmitting apparatus when the measured first transmission rate is lower than the first target transmission rate.

3. The content receiving apparatus of claim 2, wherein the information about the first target transmission rate comprises a request message requesting that the first transmitting apparatus transmits the first content at the first target transmission rate.

4. The content receiving apparatus of claim 1, wherein the controller measures a second transmission rate at which the second content is received, and controls the network interface to transmit information about the second target transmission rate to the second transmitting apparatus when the measured second transmission rate is higher than the second target transmission rate.

5. The content receiving apparatus of claim 1, wherein the controller measures a first packet loss rate related to the first transmitting apparatus, determines a first target packet loss rate based on the increased first bandwidth and the measured first packet loss rate, and controls the network interface to transmit information about the determined first target packet loss rate to the first transmitting apparatus.

6. The content receiving apparatus of claim 5, wherein the information about the determined first target packet loss rate comprises a request message requesting that the first transmitting apparatus transmits the first content at the first target packet loss rate.

7. The content receiving apparatus of claim 1, wherein the controller measures a second packet loss rate related to the second transmitting apparatus, determines a second target packet loss rate based on the decreased second bandwidth and the measured second packet loss rate, and controls the network interface to transmit information about the determined second target packet loss rate to the second transmitting apparatus.

8. A content receiving method comprising:
receiving first content from a first transmitting apparatus and second content from a second transmitting apparatus through a network interface;
selecting the first content based on a user's input, from the first content and the second content; and
controlling a first bandwidth of a bandwidth of the network interface, which is allotted to the first transmitting apparatus to increase, and a second bandwidth of the bandwidth of the network interface, which is allotted to the second transmitting apparatus, to decrease based on the increased first bandwidth,
wherein the first transmitting apparatus and the second transmitting apparatus are independent from each other,
wherein the first content is different from the second content,
wherein, in the controlling of the first bandwidth and the second bandwidth, a second target transmission rate corresponding to the decreased second bandwidth is determined, and the second bandwidth is not decreased below determined second target transmission rate, and
wherein the determined second target transmission rate is a minimum transmission rate required for the second transmitting apparatus to transmit the second content to the network interface.

9. The content receiving method of claim 8, wherein, in the controlling of the first bandwidth and the second bandwidth, a first target transmission rate corresponding to the increased first bandwidth is determined, a first transmission rate at which the first content is received is measured, and the network interface is controlled to transmit information about the first target transmission rate to the first transmitting apparatus when the measured first transmission rate is lower than the first target transmission rate.

10. The content receiving method of claim 9, wherein the information about the first target transmission rate comprises a request message requesting that the first transmitting apparatus transmits the first content at the first target transmission rate.

11. The content receiving method of claim 8, wherein, in the controlling of the first bandwidth and the second bandwidth, a second transmission rate at which the second content is received is measured, and the network interface is controlled to transmit information about the second target transmission rate to the second transmitting apparatus when the measured second transmission rate is higher than the second target transmission rate.

12. The content receiving method of claim 8, wherein, in the controlling of the first bandwidth and the second bandwidth, a first packet loss rate related to the first transmitting apparatus is measured, a first target packet loss rate is determined based on the increased first bandwidth and the measured first packet loss rate, and the network interface is controlled to transmit information about the determined first target packet loss rate to the first transmitting apparatus.

13. The content receiving method of claim 12, wherein the information about the first target packet loss rate comprises a request message requesting that the first transmitting apparatus transmits the first content at the first target packet loss rate.

14. The content receiving method of claim 8, wherein, in the controlling of the first bandwidth and the second bandwidth, a second packet loss rate related to the second transmitting apparatus is measured, a second target packet loss rate is measured based on the decreased second bandwidth and the measured second packet loss rate, and the network interface is controlled to transmit information about the determined second target packet loss rate to the second transmitting apparatus.

15. A non-transitory computer-readable recording medium having embodied thereon a computer program, which when executed by a computer, perform a content receiving method comprising:
receiving first content from a first transmitting apparatus and second content from a second transmitting apparatus through a network interface;
selecting the first content based on a user's input, from the first content and the second content; and
controlling a first bandwidth of a bandwidth of the network interface, which is allotted to the first transmitting apparatus to increase, and a second bandwidth of the bandwidth of the network interface, which is allotted to the second transmitting apparatus, to decrease based on the increased first bandwidth,
wherein the first transmitting apparatus and the second transmitting apparatus are independent from each other,
wherein the first content is different from the second content,
wherein, in the controlling of the first bandwidth and the second bandwidth, a second target transmission rate corresponding to the decreased second bandwidth is determined, and the second bandwidth is not decreased below the determined second target transmission rate, and
wherein the determined second target transmission rate is a minimum transmission rate required for the second transmitting apparatus to transmit the second content to the network interface.

16. The non-transitory computer-readable recording medium of claim 15, wherein, in the controlling of the first bandwidth and the second bandwidth, a first target transmission rate corresponding to the increased first bandwidth is determined, a first transmission rate at which the first content is received is measured, and the network interface is controlled to transmit information about the first target transmission rate to the first transmitting apparatus when the measured first transmission rate is lower than the first target transmission rate.

17. The non-transitory computer-readable recording medium of claim 16, wherein the information about the first target transmission rate comprises a request message requesting that the first transmitting apparatus transmits the first content at the first target transmission rate.

18. The non-transitory computer-readable recording medium of claim 15, wherein, in the controlling of the first bandwidth and the second bandwidth, a second transmission rate at which the second content is received is measured, and the network interface is controlled to transmit information about the second target transmission rate to the second transmitting apparatus when the measured second transmission rate is higher than the second target transmission rate.

* * * * *